United States Patent [19]

Halling

[11] 3,954,607

[45] May 4, 1976

[54] PERMSELECTIVE MEMBRANES OF DIACYL HYDRAZIDE-CONTAINING AROMATIC POLYMERS HAVING SELECTED METALS COMPLEXED THEREWITH

[75] Inventor: Robert Allen Halling, Wilmington, Del.

[73] Assignee: E. I. Du Pont de nemours and Company, Wilmington, Del.

[22] Filed: Aug. 9, 1974

[21] Appl. No.: 497,048

Related U.S. Application Data

[63] Continuation-in-part of Ser. No. 249,210, May 1, 1972, abandoned.

[52] U.S. Cl. .......................... 210/23 H; 210/500 M
[51] Int. Cl.$^2$ ......................................... B01D 13/00
[58] Field of Search ................. 210/23, 321, 500 M; 260/78 TF

[56] References Cited
UNITED STATES PATENTS

| | | | |
|---|---|---|---|
| 3,373,056 | 3/1968 | Martin | 210/23 X |
| 3,449,245 | 6/1969 | Johnson et al. | 210/23 |
| 3,567,632 | 3/1971 | Richter et al. | 210/23 |

OTHER PUBLICATIONS

Metal Chelates of Polyhydrazides, Journal of Polymer Sc., Part A, Vol. 2, pp. 1825–1832 (1964), Frazer & Wallenberger.

*Primary Examiner*—Charles N. Hart
*Assistant Examiner*—Robert H. Spitzer
*Attorney, Agent, or Firm*—James A. Costello

[57] ABSTRACT

Permselective membranes comprising hydrazide-containing aromatic polymers complexed with selected metals that form square planar coordination complexes therewith; the membranes being prepared by reacting the polymer with a salt solution of the selected metal so that the metal is incorporated into the resulting membranes; the membranes being useful, among other things, for the reverse osmosis separation of a salt solute from an aqueous solvent.

17 Claims, No Drawings

PERMSELECTIVE MEMBRANES OF DIACYL HYDRAZIDE-CONTAINING AROMATIC POLYMERS HAVING SELECTED METALS COMPLEXED THEREWITH

CROSS-REFERENCE TO RELATED APPLICATION

This is a continuation-in-part application of copending application bearing U.S. Ser. No. 249,210, filed on May 1, 1972, now abandoned.

BACKGROUND OF THE INVENTION

1. Field of the Invention

This invention relates to permselective membranes and their preparation and use, said membranes comprising hydrazide-containing aromatic polymers and metals in valence states which form square planar coordination complex structures with ligands. These membranes are particularly useful for the reverse osmosis desalination of sea and brackish saline waters.

2. Description of the Prior Art

Permselective membranes which preferentially permeate certain components of liquid mixtures while retaining other components have long been known, as has the principle of reverse osmosis, wherein a hydrostatic pressure in excess of the equilibrium osmotic pressure of a liquid mixture is applied to the mixture to force the more permeable components of the mixture, usually water, through the membrane in preference to the less permeable components, usually a salt, contrary to normal osmotic flow.

It is well known that complete separation of the more permeable from the less permeable components of liquid mixtures is never obtained with permselective membranes in practical use. All components of a mixture permeate to some degree through any membrane which has a practical permeation flux rate for the more permeable components. In general, membranes of any particular type can be prepared with a range of flux rates, the membranes having higher flux rates also have correspondingly lower rejection efficiencies for the less permeable components. A principal goal with such membranes has been the production of membranes with economically attractive optimum balances of high flux rates for more permeable components and high rejection efficiencies for less permeable components of liquid mixtures.

U.S. Pat. No. 3,567,632 discloses asymmetric permselective membranes made from substantially linear synthetic organic nitrogen-linked aromatic polymers, including polymers containing amide and diacyl hydrazide linking groups. This reference does not disclose such membranes containing complexed metals.

U.S. Pat. No. 3,526,001 discloses that permselective membranes made of a variety of polymers can be used to separate cupric salts from aqueous solutions by a reverse osmosis process. This reverse osmosis process will not form a membrane containing a copper complex.

Frazer and Wallenberger described in the Journal of Polymer Science, Part A, Volume 2, pages 1825–1832 (1964) the preparation and properties of metal chelates of aromatic polyhydrazides. The chelate-containing films were prepared by soaking films of polyhydrazides, i.e. poly(diacyl hydrazides), presumably formed by substantially complete evaporation of solvent from a pellicle of a polymer solution, in solutions containing Cu(II) and Co(II) salts in undefined solvents. The resulting films are not permselective. The reference also teaches mixing a polymer solution with a salt solution in a polymer solvent and producing bulk chelates that are intractable.

Furthermore, this reference teaches chelates of polyhydrazides with metal ions such as Hg(II), Pb(II), and Al(III) which do not form square planar coordination complexes with ligands. Attempts to incorporate such metal ions into membranes of the polymers useful in the membranes of this invention have resulted in no significant changes in the measured permselective separation properties of the membranes.

SUMMARY OF THE INVENTION

This invention concerns a permselective polymeric asymmetric membrane comprising
  i. a diacyl hydrazide-containing, substantially linear, aromatic, synthetic organic polymer comprising alternating linking groups and organic radicals, and
  ii. a metal or mixture of metals wherein each metal is in a square planar coordination complex relationship with the polymer,
the permselective membrane characterized by having metal complexed with the polymer in the amount of at least one gramatomic weight of metal for each 20 gram-formula-weights of linking groups.

This invention also concerns the process for preparing the permselective polymeric asymmetric membranes described above. The novel process comprises contacting and reacting, at a temperature between about −25°C. to 50°C., a polymer-liquid pellicle of the diacyl hydrazide-containing aromatic polymer described above with a metal salt solution and incorporating the metal into the resulting membrane.

The polymer-liquid pellicle that is reacted with the metal salt has two surfaces. In one process aspect, the pellicle is an asymmetric permselective membrane having a liquid therein which is a nonsolvent for the polymer. In another process aspect, the liquid in the pellicle is a solvent for the polymer. Optionally, in the instance where the liquid in the pellicle is a solvent for the polymer, the pellicle can contain one or more of a polymer-solubilizing salt, water, and a plasticizer.

In the asymmetric membrane pellicle, one surface is relatively porous while the other surface is less porous and more dense. In the solution pellicle, both surfaces are relatively porous. In the process for reacting metal salt with either type of pellicle, the metal salt reacts at the (more) porous surface(s). There is no reaction at the more dense (skin-type) surface. Thus, contact between an asymmetric membrane pellicle and metal salt wherein the metal salt contacts the pellicle only at the dense, skin-type surface does not constitute a process of this invention.

This invention also concerns a process for the reverse osmosis separation of solute from an aqueous solution comprising contacting the permselective membrane of the invention with an aqueous salt solution at a pressure greater than the osmotic pressure of the solution.

The novel asymmetric, metal-containing membranes of this invention have a superior balance of flux rate to rejection efficiency. For instance, flux rates can be significantly increased without proportional loss in rejection efficiency. Thus, the membranes of this invention have higher flux rates per level of rejection efficiency than do membranes of the prior art. The result is a reverse osmosis process, employing the membranes of this invention, that produces more water at the same purity as compared to a process employing art-known membranes.

Definition of Terms

The diacyl hydrazide-containing polymers employed herein are substantially linear, synthetic, organic, nitrogen-linked aromatic polymers essentially of the type described in coassigned U.S. Pat. No. 3,567,632, said polymers having the formula $(L-R)_n$
wherein
the -L- groups and -R- radicals are alternating, each -L- group is a linking group and at least about 50 percent of the —L- groups contain a nitrogen atom in the polymer chain, and at least 5 percent of the -L- groups contain the diacyl hydrazide group

each -R- group is an organic radical and at least about 50 percent of the —R- groups consist essentially of a 5-member ring or a 6-member ring subject to resonance bonding; and
the degree of polymerization is defined by n, an integer sufficiently large to provide film-forming molecular weight;
the polymer having a solubility at 25°C. of at least about 10 percent by weight in a solvent medium consisting essentially of from 0 to 3 percent by weight of lithium chloride dissolved in at least one member selected from the group consisting of dimethylacetamide, dimethyl sulfoxide, N-methylpyrrolidone and hexamethylphosphoramide.

Concerning the polymers employed in making the membranes of this invention: "Substantially linear" polymers exhibit the general solubility and melting properties characteristic of linear polymers as contrasted to highly cross-linked polymers but can contain minor amounts of cross-linked and chain-branched structures.

"Synthetic organic" polymers are man-made in the usual connotation and are composed substantially of carbon, hydrogen, oxygen, nitrogen, and sulfur. These polymers can also contain minor amounts of other atoms.

"Nitrogen-linked" polymers contain nitrogen atoms in the polymer chain as linking parts of at least about 50 percent of the linking —L— groups. They can also contain other nitrogen atoms either as part of or attached to the organic radical —R— groups. Any remaining linking groups can be other functional groups formed by condensation reactions, such as ether and ester groups.

"Aromatic" polymers are polymers in which at least about 50 percent of the organic radical —R— groups contain 5-membered or 6-membered ring systems subject to resonance bonding and which can contain hetero atoms such as oxygen and nitrogen.

By "metal" or "mixture of metals" as employed herein is meant: one or more metals each in a valence state that facilitates formation of square planar coordination complex structures with ligands, at least one gram-atomic-weight of said metal or metals being present for each 20 gram-formula-weights of linking groups in the polymer.

By "pellicle" as employed herein is meant: a combination of polymer and liquid comprising from about 25 to 80 weight percent, based on weight of the polymer and liquid, of at least one diacyl hydrazide-containing aromatic polymer as described above, and from about 20 to 75 weight percent, based on weight of the polymer and liquid, of a liquid that is soluble at the contacting temperature to the extent of at least 25 percent by weight in the metal salt solution.

By "metal salt solution" as employed herein is meant: a salt of a metal or mixture of metals each metal being in a valence state that facilitates square planar coordination complex structures with ligands, the salt being dissolved in a medium that does not dissolve the polymer appreciably.

By "permselective membrane" as employed herein is meant: a thin structure, e.g. a coating or film, with the ability to preferentially permeate one or more components of a fluid mixture while simultaneously restraining permeation of one or more less permeable components. The permselective membranes of this invention have a thickness of from about 0.08 to 15.2 mils and more commonly from about 0.2 to 7.2 mils.

For the purposes of the present invention, a membrane is considered "permselective" which exhibits
i. a water permeability of at least about 0.5 gallons per square foot per day and
ii. a solute rejection greater than about 80 percent when the membrane is exposed under permselective separation conditions to a mixture of the solute and water. The solute can be ionic or non-ionic in nature and monomeric or polymeric in character. These membranes reject much higher fractions of solutes of larger size. Frequently, these membranes have water permeabilities greater than 5 gallons per square foot per day and salt rejections greater than 80 percent when exposed at pressures as high as 1000 pounds per square inch to synthetic sea water feeds (recipe of Test Method D-1141 of the American Society for Testing Materials) under conditions such that between 5 percent and 20 percent of the solvent in the feed mixture passes through the membrane.

These membranes have an "asymmetric" structure, i.e. they contain a very thin less porous region of high polymer density and low void fraction at one surface and a thick more porous region of low polymer density and high void fraction at the other surface. During their use as permselective membranes, the mixture to be separated is contacted with the surface having the thin, less porous, more dense surface region.

Permselective membranes are also used in such processes as dialysis and ultra-filtration and in the separation of the components of gaseous mixtures. In all of these processes, a feed mixture is separated into a permeate mixture containing an increased concentration of the more permeable components and a reject mixture containing an increased concentration of the less permeable components.

As used herein, the term "reverse osmosis" applies particularly to those permselective membranes and processes wherein a dissociated salt is preferentially rejected from an aqueous solution while water passes through the membrane counter to the normal osmotic direction of flow under the influence of a pressure greater than the osmotic pressure of the solution.

DETAILS OF THE INVENTION

The Polymers

Concerning the polymer, each —L— group and each —R— group can be the same as or different from every other —L— group or —R— group along the same polymeric backbone chain. Preferably the polymers are condensation polymers formed by a condensation polymerization reaction as contrasted to a free-radical polymerization reaction. Polymers are useful which have molecular weights of sufficient magnitude so that they are film-forming and so that they have a non-tacky surface at room temperature. Polymers with an inherent viscosity above about 0.6 are useful and polymers with inherent viscosity above about 1.0 are preferred. The polymers must also be soluble in certain water-miscible dipolar aprotic solvents so that they can be put readily into membrane form. Compatible physical mixtures of polymers of any of the described types can also be employed.

The linking —L— groups in the general formula are chosen so that at least 50 percent of the —L- groups in each polymer backbone chain consists of the structures

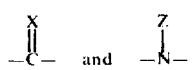

wherein at least one of each type of structure is present in any sequence such that no one structure of either of these types is adjacent to more than one other structure of the same type. It should be understood that the structures of the linking groups recited herein are given without regard to the direction in which the structures are read; that is, these linking groups can appear both as recited and as the reverse structure in a single polymer chain.

Consistent with the definition of the polymers employed herein, each "X" in the

structure can be independently oxygen or sulfur, and is preferably oxygen, and each "Z" in the

structure can be independently hydrogen, a one to four carbon alkyl, or phenyl and preferably at least one-fourth of all the "Z"'s are hydrogen. Typical and preferred examples of -L- groups of this class of polymers are (a)  (the amide group)

(b)  (the oxamide group)

(c) 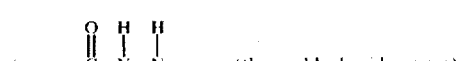 (the acyl hydrazide group)

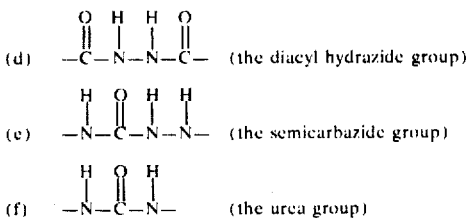

(d) (the diacyl hydrazide group)

(e) (the semicarbazide group)

(f) (the urea group)

Polymers containing such nitrogen-containing linking —L— groups can be prepared by well-known methods such as condensing dibasic acid cholrides with diamines (to from amide linking groups), dibasic acid chlorides with dihydrazines (to form acyl hydrazide linking groups), dibasic acid chlorides with dihydrazides (to form diacyl hydrazide linking groups), diisocyanates with dihydrazides (to form semicarbazide linking groups), diisocyanates with diamines (to form urea linking groups), and so on.

In more preferred polymers, the linking -L- groups are amide groups and diacyl hydrazide groups. More preferably each of these two groups constitute 50 percent of the —L— groups present, but all the linking groups can be diacyl hydrazide groups.

At least about 5 percent of the linking —L— groups in the polymers of the membranes of this invention must contain diacyl hydrazide groups. Thus, one diacyl hydrazide group must be present in the polymer structure for each 20 linking groups. The group which contains the diacyl hydrazide group can be an acyl semicarbazide group.

The aromatic polymers employed herein can be carbocyclic or heterocyclic. The remaining -R- groups can be aliphatic or aromatic radicals, including fused carbocyclic and heterocyclic radicals and radicals of the formula

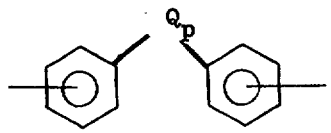

in which p is zero or one and Q is a divalent radical selected from the group consisting of -CO-, -O-, -S-, —SO$_2$—, —NH—, and lower alkylene such as methylene, ethylidene, or isopropylidene. The aromatic radicals in these polymers can be unsubstituted or can have substituents which do not change the fundamental characteristics of the polymer.

Preferably, the polymers of the membranes of this invention contain phenylene —R— groups; more preferably both meta- and para-phenylene groups are present. A particularly preferred class of polymers are those in which about 50 to 90 percent of the —R— groups are metaphenylene groups and about 10 to 50 percent of the —R— groups are para-phenylene groups.

The Pellicle

The form of the pellicle can vary, for instance, two of such forms are as a membrane pellicle or a solution pellicle. When the pellicle is a membrane pellicle it is asymmetric, that is, it is characterized by having one side that is relatively open and porous and by one side that is covered by a thin, very dense skin. It is the open, porous side that is reactable with the metal salt solutions described herein.

When the pellicle is a membrane pellicle the liquid component thereof is present as part of the physical form of the polymeric material, e.g., is contained in voids, pores and spaces in the polymer structure. In this embodiment the liquid component of the pellicle and the medium of the metal salt solution with which the pellicle is contacted are both non-solvents for the polymer and are preferably independently selected from the group consisting of water, lower alcohols, e.g. methanol and ethanol, and mixtures thereof. Such permselective membranes can be of the type disclosed in coassigned U.S. Pat. No. 3,567,632 which are made of polymers of the types described hereinabove. In other similar art-known membranes the liquid in the pellicle can be, for example, a mixture of glycerine and water.

When the pellicle is a solution pellicle each side is relatively open and porous and reactable with a metal salt solution described herein.

Solution pellicle forms include that of a film on a flat or cylindrical solid surface and that of a coating on a porous surface. Normally, the solution pellicle thickness is within the range of from about 0.1 mil to 40 mils, more usually in the range of from about 0.2 to 25 mils. Such thin-shaped structures can be prepared either by forming the desired structure with a dope containing polymer, solvent, and optionally salt, and/or water, and/or plasticizer in the correct proportions or by forming a thin structure of a dope containing too much solvent and/or water and then partially evaporating until the residual composition is within effective proportions. Since the optimum content of solvent, salt, water, and plasticizer generally imparts to the mixture a rather high viscosity, a dope containing an excess of solvent is more conveniently put into the desired form and then partially dried to obtain a solution pellicle of the desired composition.

In preparing solution pellicles, a dope is usually filtered through a fine filter and then poured onto the smooth surface of a metal or glass plate while carefully excluding dust or other foreign matter. The film is then spread or drawn to a thickness of about 2 to 40 mils (0.051 to 0.102 millimeters) with a doctor knife. The film can be cast at temperatures of from about 10°C. to 150°C. The film, supported on the plate, can then be partially dried to obtain a solution pellicle having the desired composition, for instance by exposure to moving air while heating the supporting plate. Tubular solution pellicles can be formed on the inner surface of cylindrical tubes by methods known in the art.

Solution pellicles contemplated herein comprise about 20 to 75 percent of a liquid which is a solvent for the polymer, said solvent dissolving the polymer sufficiently so that gross phase separation does not occur. Metal-containing membranes prepared by the contacting of solution pellicles comprising more than about 80 percent polymer generally have unsatisfactory low water permeability and, similarly, membranes prepared by contacting solution pellicles comprising more than about 75 percent liquid generally have undesirably low solute rejection.

Preferably the liquid is a water-miscible dipolar, aprotic organic solvent. By water miscible is meant any solvent which is capable of mixing with water in all proportions without separation into two phases. By dipolar aprotic is meant any solvent which has a dielectric constant greater than about 15, and, although it can contain hydrogen atoms, cannot donate suitable labile hydrogen atoms to form strong hydrogen bonds with an appropriate species. Especially preferred water miscible dipolar aprotic organic solvents include N,N-dimethylformamide, dimethyl sulfoxide, tetramethylurea, N-methylpyrrolidone, dimethylacetamide, tetramethylene sulfone, and hexamethylphosphoramide.

It is preferred, though not necessary, that some polymer-solubilizing salt be present in solution pellicles. The solution pellicles can contain from 0 to 40%, based on volume of the polymer, of such a salt. Greater amounts of salt usually cause large increases in solute passage so that the resulting membrane may not be useful in reverse osmosis processes but may be useful in dialysis or ultrafiltration processes.

Suitable salts not only increase the solubility of the polymer in the liquid but also usually increase the water permeability of the final membrane at least roughly in proportion to the volume percent of the salt, based on the volume of the polymer, present in the pellicle. The volume fraction of the salt present can be calculated from the weights of the salt and polymer and their respective densities. The densities of many suitable salts are listed in the "Handbook of Chemistry and Physics", published by the Chemical Rubber Publishing Company. Although the densities of different polymers vary somewhat, it has been found that a value of 1.31 grams per cubic centimeter can be used, without substantial error in calculating the volume fraction of salts, as the density of any polymer useful in making the membranes described herein.

The type of salt present in a solution pellicle influences the permeability and separation effectiveness of a membrane obtained therefrom. Contemplated soluble polymerizing salts include the salts of Groups IA and IIA metals of the Periodic Table and are preferably highly dissociated, are soluble in the amount present, and are chemically inert toward the other materials involved in the process. Suitable salts include lithium chloride, lithium bromide, lithium nitrate, calcium nitrate, and calcium chloride. A desired balance of properties can frequently be obtained by the optimum choice of the type and amount of polymer solubilizing salt in the solution pellicle.

Mixtures of two or more polymer solubilizing salts are preferred in solution pellicles. Particularly preferred are solution pellicles containing mixtures of lithium nitrate and calcium chloride in volume ratios between about 5 percent and 25 percent lithium nitrate and about 25 percent to 5 percent calcium chloride in which the combined amounts of lithium nitrate and calcium chloride are between about 10 percent and 40 percent. The membranes obtained from solution pellicles containing amounts of these salts between these limits have particularly attractive combinations of water flux and salt rejection for use in reverse osmosis desalination of sea and saline waters.

The solution pellicles can also contain up to about 25 percent water, based on the weight of polymer present. Larger amounts of water, like larger amounts of salts, tend to increase the permeability and to reduce the selectivity of the membrane. Extreme amounts of water which cause precipitation of the polymer from the polymer solution must be avoided.

Optionally the solution pellicles contain up to about 60 percent, based on the weight of the polymer, of a plasticizer for the polymer. Suitable plasticizers are sufficiently soluble in the solution of the square planar coordinating metal salt with which the pellicle is contacted to be removed from the pellicle by such contact, and sufficiently higher boiling than the polymer solvent so that the solvent is preferentially removed during pellicle preparation processes which involve evaporation of the solvent from a polymer solution.

The preferred plasticizers are organic compounds containing one or more amide linkages. Typical useful plasticizers are N-acetylmorpholine, N-acetylpiperidine, N,N-dimethylbenzamide, N,N'-diacetyl-N,N'-dimethylethylene diamine, N-methylpyrrolidone, diacetyldiethylenetriamine, and N-acetylpiperazine. Other useful plasticizers include poly(ethylene oxide) and poly(propylene oxide) of suitable molecular weight and solubility, pyridine oxide, hexamethylphosphoramide, tetramethylene sulfone and paratoluenesulfonamide. A particularly preferred plasticizer is 2,11-diacetyl-2,11-diaza-5,8-dioxadodecane. This plasticizer can be prepared by converting triethylene glycol to the dichloride, reacting with methylamine, and acetylating, all as is well-known in the art.

A solution pellicle obtained by solvent evaporation preferably contains about 20 to 50 percent plasticizer. At such concentrations, the plasticizer makes the water permeability and salt rejection properties of the membrane less sensitive to the heating time and the temperature used in preparing the solution pellicle.

Other components are sometimes desirable in the instant solution pellicles. For example, a small amount of triethanolamine serves as a buffer, maintaining the solution pellicles slightly basic and thereby avoiding polymer degradation during extended heating periods.

As will be readily apparent, the various polymers, liquids, salts, media, water, and plasticizers described herein must be substantially chemically inert toward and compatible with the other materials involved to be useful in the processes of this invention.

The Metals

The permselective membranes of this invention contain a metal or mixture of metals each in a valence state which forms square planar coordination complex structures with ligands. These metals are found in the transition portion of the Periodic Table and are in an ionic valence configuration which forms "$d\ sp^2$" orbital valence bonds with appropriate ligand structures. The useful metals in suitable valence states include the Co(II), Ni(II), Cu(II), and Pd(II) ions and mixtures thereof. The preferred metal is copper in the Cu(II) valence state.

The chemistry of coordination complexes of such metals in suitable valence states is discussed in detail (a) by Mellor in an article "The Stereochemistry of Square Complexes" in *Chemical Reviews*, Volume 33, pages 137–183 (1943); (b) by Martell and Calvin in Chapter 7, "The Structure of Chelate Compounds," pages 254–296 and particularly page 283, of the book "Chemistry of the Metal Chelate Compounds," (Prentice-Hall, New York, 1952); and (c) by Graddon in Chapter III, "Transition Metal Stereochemistry," pages 63–82, in the book "An Introduction to Coordination Chemistry," (Pergamon, Oxford, Second Ed., 1968).

Without desiring to be bound by any particular theoretical or mechanistic concept of the factors responsible for the improved permselective properties of the membranes of this invention, it is assumed that they contain square planar chelate coordination complexes of the effective metals and the diacyl hydrazide units in the polymer structure. Evidence of chelate formation includes (1) a 1:1 correspondence between the amount of metal which can be incorporated into a polymer and its content of diacyl hydrazide units, (2) a shift to a lower frequency in the characteristic carbonyl absorption in the infra-red spectrum of the metal-containing polymer, (3) an increase in the acidity of solutions from which metals are incorporated into membranes, reflecting transfer of hydrogen ions from the —NH— structures of the polymer into the solution, (4) a change in the characteristic infrs-red absorption pattern of —NH— groups in the spectrum of the metal-containing polymer, (5) a lower solubility for the metal-containing polymers in dipolar aprotic solvents, and (6) the well-known stability of chelates of such metals in effective valence states with ligands which produce 5-membered and 6-membered chelate ring structures which include oxygen and trivalent nitrogen atoms. It is postulated that the improved permselective properties of the metal-containing membranes of this invention reflect the increased regularity in orientation, the increased and restrained interplanar spacings, and the added electrical effects expected from the presence of polymeric square planar coordination complex structures.

Sufficient appropriately-coordinating metal should be present in the membranes of this invention to advantageously modify the permselective properties of similar metal-free membranes. Significant improvements are obtained with incorporation of at least about one gram-atomic-weight of a suitable metal for each 20 gram-formula-weights of linking groups in the polymer of which the membrane is made. Preferred membranes contain more than about one gram-formula-weight of metal for each 10 gram-formula-weights of linking groups in the polymer. At least theoretically, it is possible to obtain, through the process described subsequently herein, membranes containing one gram-formula-weight of metal associated with each gram-formula-weight of hydrazide groups in the polymer and, with a completely aromatic polyhydrazide, with each gram-formula-weight of linking groups.

Preferred metal salts useful for introducing such metals into pellicles are the chloride, sulfate, nitrate and acetate salts. Such salts can be employed at any concentration up to their limit of solubility in a suitable medium. Higher concentrations of more soluble salts are preferred. For example, cupric nitrate and cupric acetate in a methanolic medium are particularly preferred. The reacting solution should have an acidity at which a complex of the polymer and the metal is stable since the amount of the metal incorporated into the resulting membrane and the physical and permselective properties of the membrane are influenced by the acidity of the contacting solution.

Copper salts in the Cu(II) valence state are preferred. Incorporation of copper into poly(amidehydrazide) membranes, in particular, causes significant desirable changes in the physical and permselective separation properties of the membranes. The resulting increases in water permeability and the accompanying changes in solute rejection are larger when copper is introduced into the membrane by contacting a solution pellicle containing a mixture of lithium nitrate and calcium chloride as polymer solubilizing salts.

The metal-containing medium can be water, methanol, ethanol, and the like and mixtures thereof. The preferred media are methanol and methanol-water mixtures containing more than about 50 percent methanol. These preferred media promote the rapid incorporation of larger amounts of the coordinating metal into the resulting membrane, thereby producing membranes with high permeabilities.

The membranes obtained by exposing a solution pellicle to copper nitrate solutions in methanolic media can have balances of water permeability and salt rejection which make them particularly attractive for use in reverse osmosis desalination processes.

The Membranes

Art-known membranes are characterized by the disadvantage that those that have the highest flux have correspondingly poorer rejection efficiencies. It has now been found that membranes (of the invention) can be made that have high flux rates without correspondingly lower rejection efficiencies. That is, although rejection efficiencies may vary somewhat, such efficiencies remain surprisingly high in view of the high flux rate characteristics. In short, the membranes of this invention provide very high flux rates at given rejection efficiencies.

The modification in permselective properties may be a significant increase in water permeability (high flux rates) with or without a change in solute passage properties. For example, the water permeability may be increased by more than about 5 percent with little or no change in solute passage or by more than 50 percent without unduly altering its useful property of solute rejection.

It is preferred that the polymer in the membrane, the solution of a suitable square planar coordinating metal salt, and the exposure conditions are such as to introduce into the polymer of the membrane at least one gram-atomic-weight of metal for each 10 linking groups in the polymer to obtain a membrane containing the metal and polymer linking groups in a ratio of gram-atomic-weights of metal to gram-formula-weights of linking groups of at least 0.1. The production of individual membranes with a desired balance of water permeability and salt rejection properties is made possible by control of the amount of metal introduced into the membrane through adjustment of the conditions under which metals are incorporated into the membranes.

The incorporation into membranes of the metals described herein also alters the physical properties of the membranes. The metal-containing membranes are much less soluble in polar liquids and therefore are more resistant to change in properties during use in the separation of components from solutions of such liquids. Such membranes may also be more "stiff" in their structure and resist mechanical compaction and other changes in their properties which could be caused by exposure to pressure and elevated temperatures.

The flux rates of permselective membranes are conveniently expressed in terms of the quantity of the more permeable component of the feed mixture that passes in a given time through a membrane of a given size under a specified applied or effective pressure. For practically useful reverse osmosis membranes, the water flux rate is defined as the number of gallons of water passing through one square foot of membrane surface per day under a given pressure. The "effective pressure" is the difference in the hydraulic pressures across the membrane corrected for the difference in the osmotic pressures across the membrane. The effective area of a membrane is the total area of the membrane exposed to the feed mixture under pressure.

The separation effectiveness of a permselective membrane is conveniently expressed in terms of the percentage fraction of one of the less permeable components which is rejected or passed by the membrane. The solute rejection efficiencies of reverse osmosis membranes are conveniently expressed in terms of the percentage of the salt in the feed mixture which is passed by the membrane, calculated by the equation $$\text{Percent salt passage} = \frac{\text{salt concentration in permeate}}{\text{salt concentration in feed}} \times 100$$

and the concentrations of salt in the feed and the permeate mixtures are conveniently determined conductometrically or by chemical analysis.

The Process for Making the Membranes

This novel process comprises reacting a pellicle as heretofore defined, with a solution of a square planar coordinating salt of a suitable metal or mixture of metals in a suitable medium under conditions that result in incorporation into the resulting permselective membrane of a sufficient amount of the metal or mixture of metals to modify the permselective properties of the membrane. The reacting temperature can be any temperature between about $-25°C$ and $50°C$. Suitable contacting times range from less than 5 minutes to a few days or longer at ambient temperatures. Preferably, the process involves reacting the pellicle with a relatively large volume of a solution containing an excess of the salt under conditions that involve efficient contact between the pellicle and the solution.

The pellicle which is reacted with the salt of the coordinating metal is a membrane pellicle or a solution pellicle. When the pellicle is a membrane pellicle, is has been found that reacting only the more dense, less porous portion with the salt solution, even under reverse osmosis separation conditions, does not introduce into the membrane sufficient of the metal to modify the permselective properties of the membrane. In fact, it is imperative that the metal salt of mixture of metal salts be reacted with the pellicle at its open and porous side. Otherwise, no significant reaction will take place. Of course, in the process for incorporating the metal into the polymer solution before formation of the dense skin, there is no problem in getting the metal salt into the polymer interstices. Conveniently and preferably the asymmetric membrane pellicle is immersed in the metal salt solution so that the solution contacts both surfaces of the pellicle.

When the pellicle is a solution pellicle, the medium of the solution replaces the liquid of the pellicle, any polymer-solubilizing salt and/or plasticizer present are removed, a permselective membrane is formed, and the square planar coordinating metal or mixture of metals is incorporated into the polymer. The solution pellicle can be cast upon a porous or a nonporous support. In the case of a nonporous support, the resulting membrane will become loosened so that both surfaces of the membrane are exposed to the solution. This process introduces metal into all parts of the resulting membrane.

The solution pellicle can be contacted with a nonsolvent for the polymer so as to partially remove polymer solvent, plasticizer, polymer-solubilizing salt, or water present in such solution pellicle before reaction of the pellicle with the metal salt solution.

The solution pellicle process provides an economical and practical method for simultaneously (1) removing from a pellicle of the solution type, a polymer solvent and any polymer-solubilizing salt and/or plasticizer contained therein, (2) forming a permselective membrane with a highly desirable physical structure, and (3) introducing into the polymer of the membrane a metal which provides an economically attractive balance of high flux rates for more permeable components and high rejection efficiencies for less permeable components of liquid mixtures.

The following Examples are intended to illustrate the invention and not to limit the invention. Unless otherwise indicated, all quantities are by weight. Where plasticizer is employed it is 2,11-diacetyl-2,11-diaza-5,8-dioxadodecane. Percentages of polymer-solubilizing salt are by volume, and percentages of plasticizer are by weight, both based on polymer volume and weight, respectively.

EXAMPLE 1

This Example describes membranes that have increased water permeability and similar rejection efficiencies to non-metal-containing membranes.

A polymer was prepared by condensing a mixture of 80 parts of 3-aminobenzhydrazide and 20 parts of 4-aminobenzhydrazide and a stoichiometrically equivalent amount of a mixture of 70 parts of isophthaloyl chloride and 30 parts of terephthaloyl chloride in dimethylactamide solution. This polymer was isolated by pouring the condensation mass into ice water, washing free of acid, and drying. This polymer had an inherent viscosity near 1.1 as measured with a solution containing 0.5 weight percent polymer in dimethylacetamide at 25°C.

A solution of this polymer was prepared which had the following composition:

| Component | Parts by Weight | Percentage |
|---|---|---|
| Polymer | 15 | |
| Lithium nitrate | 4.5 | 16.5 |
| Plasticizer | 6.0 | 40 |
| Triethanolamine | 0.08 | |
| Dimethylacetamide | 74.4 | |

This solution was loaded into vertical glass tubes above conical spreaders at the bottoms of the tubes and the spreaders were then moved upward in the tubes by air pressure. The spreaders were sized to give a film thickness of 15 mils. The glass tubes and films were heated in a tubular electrically heated column to raise the temperature of the glass tubes to a uniform 100°C. while air heated to 60°C. was passed through the glass tubes. After 25 minutes of heating, the glass tubes and the resulting solution pellicles were allowed to cool and methanol was circulated through the inside of the tubes for one hour. The resulting tubular membrane pellicles were slipped out of the glass tubes, cut into short lengths, and stored in water.

Portions of these tubular membrane pellicles were immersed in aqueous copper chloride and copper sulfate reacting solutions of the concentrations given in Table 1. The immersion solutions became more acidic and the membranes became light brown. Other portions of the tubular membrane pellicles (used as controls) were immersed in water acidified to the same pH's as the copper salt solutions with, respectively, hydrochloric and sulfuric acids. These membranes remained colorless. After 7 days, each of the tubular membrane portions was rinsed with water, slit axially to form flat membranes, and stored in water.

The permselective properties of these membranes were determined under reverse osmosis conditions in a stirred test cell of the type shown in U.S. 3,567,632, using an aqueous test solution containing 20,000 parts per million of chloride ion added as a synthetic sea salt (Lake Products Co., St. Louis, Mo.) of the composition of Formula A in ASTM Method D-1142-52 and operating at a pressure of 1000 pounds per square inch under recirculating conditions such that less than 5 percent of the solution passing through the test cell passed through the membrane. Water permeabilities were normalized to a nominal test temperature of 25°C. Chloride ion concentrations in the solutions passing through the membranes were determined colorimetrically. The data obtained are given in Table 1 below.

TABLE 1

| Example No. | Salt | Reacting Solution Molar Concentration | pH Initial | pH 3 Day | pH 7 Day | Color | Membrane Properties 48 Hours Water Permeability gal/sq.ft./day | Chloride Passage Percent |
|---|---|---|---|---|---|---|---|---|
| 1A | $CuCl_2$ | 0.0155 | 4.9 | — | 3.6 | Lt. Brown | 16.7 | 0.27 |
| Control | None | — | 4.9 | — | 4.9 | None | 12.5 | 0.3 |
| 1B | $CuCl_2$ | 0.0155 | 4.8 | 3.7 | — | Lt.Brown | 16.6 | 0.69 |
| Control | None | — | 4.8 | 5.9 | — | None | 13.5 | 0.6 |
| 1C | $CuSO_4$ | 0.0157 | 4.8 | 3.8 | — | Lt. Brown | 17.2 | 0.55 |
| Control | None | — | 4.8 | 6.3 | — | None | 14.5 | 0.69 |

EXAMPLE 2

This Example demonstrates the control that is possible by employing varying metal concentrations and media for the metal to achieve good water permeability with a surprisingly small decrease (if any) in the salt rejection efficiency. This surprisingly small decrease in rejection efficiency is contrary to what one skilled in the art would expect employing art-known membranes.

solutions of the polymer of Example 1 were prepared which had the following composition:

| Component | Parts by Weight | Percentage |
|---|---|---|
| Polymer | 13 | |
| Lithium nitrate | 3.9 | 16.25 |
| Calcium chloride | 2.6 | 10.25 |
| Plasticizer | 5.2 | 40 |
| Triethanolamine | 0.07 | |
| Dimethylacetamide | 75.3 | |

Tubular membrane pellicles were prepared from these solutions as described in Example 1 except that the heating time was 75 minutes. These pellicles were rinsed with water and stored in water. Portions of these membrane pellicles were immersed in solutions of metal salts as described in Table 2 for 4 days; rinsed with water, and stored in water. The permselective properties of the resulting membranes were determined as described in Example 1 to obtain the data set out in Table 2 below.

TABLE 2

| Example No. | Salt | Reacting Solution Molar Concentration | Medium | pH | Color | Membrane Properties Water Permeability gal./sq.-ft./day | Chloride Passage, Percent |
|---|---|---|---|---|---|---|---|
| Control | None | — | water | 4.7 | None | 21.1 | 2.3 |
| 2A | CuSO₄ | 0.0157 | water | 4.7 | Lt.Brn | 22.2 | 2.1 |
| 2B | CuSO₄ | 0.0314 | water | 4.7 | Lt.Brn | 22.3 | 2.9 |
| Control | None | — | (1) | 4.5 | None | 22.3 | 1.28 |
| 2C | CuSO₄ | 0.0157 | (1) | 4.5 | Brown | 30.0 | 3.2 |
| 2D | CuSO₄ | 0.0314 | (1) | 4.5 | Brown | 31.8 | 3.9 |
| Control | None | — | Methanol | — | None | 15.7 | 0.81 |
| 2E | CuSO₄ | 0.0157 | Methanol | — | Dk.Brn | 35.3 | 5.1 |
| 2F | CuSO₄ | 0.0314 | Methanol | — | Dk.Brn | 42.0 | 6.1 |
| Control | None | — | Methanol | — | None | 11.9 (2) | 0.54 |
| 2G | Cu(NO₃)₂ | 0.0157 | Methanol | — | Dk.Brn | 25.5 (2) | 2.3 |
| 2H | Cu(NO₃)₂ | 0.0314 | Methanol | — | Dk.Brn | 26.6 (2) | 2.3 |
| 2I | Cu(NO₃)₂ | 0.0785 | Methanol | — | Dk.Brn | 35.5 (2) | 5.1 |
| 2J | Cu(NO₃)₂ | 0.157 | Methanol | — | Dk.Brn | 38.6 (2) | 6.8 |

(1) Mixture of equal volumes of methanol and water
(2) Test time 240 hours; all others 96 hours

EXAMPLE 3

A polymer was prepared by condensing a mixture of 1,2-bis-(4'-benzoyloxy)-ethane dihydrazide

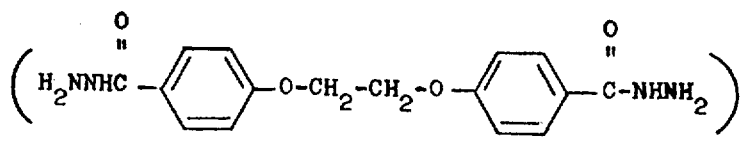

and isophthaloyl dihydrazide

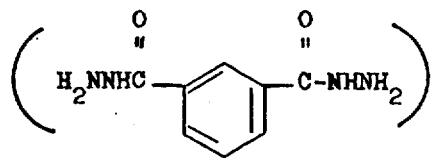

in equal molar amounts and a stoichiometrically equivalent amount of a mixture of 70 parts of isophthaloyl chloride and 30 parts terephthaloyl chloride in dimethylacetamide solution. This polymer was isolated by pouring the condensation mass into ice water, washing free of acid and drying. This polymer had an inherent viscosity of 1.05 as measured with a solution containing 0.5 weight percent polymer in dimethylacetamide at 25°C.

A solution of the polymer was prepared which had the following composition:

| Component | Parts by Weight | Percentage |
|---|---|---|
| Polymer | 14.0 | |
| LiNO₃ | 4.2 | 16.5 |
| CaCl₂(anhyd.) | 2.8 | 10.4 |
| Plasticizer | 5.6 | 40 |
| Triethanolamine | 0.07 | |
| Dimethylsulfoxide | 72.7 | |

The solution was drawn on glass plates at 25°C. into films with a normal thickness of 15 mils. The film and glass supports were heated to 100°C. over a 10-minute period and then held at this temperature. Total heating time was 30 minutes. These solution pellicles and glass plates were cooled for 2 minutes to a temperature of about 35°C. and then were rapidly immersed in stirred solutions of methanol and water (50/50 by vol.). After one hour in the methanol/water solution, the membrane pellicles were removed, rinsed with water and stored in water and 2 of them were immersed in the copper-containing solution indicated in Table 3. One copper containing membrane and one non-copper containing membrane (control) were tested for their permselective properties as in Example 1. The permselective properties after 168 hours on test are given in Table 3.

Another copper containing and another noncopper containing membrane were placed in an aqueous sulfuric acid solution at pH of 1.0 for 5 days. These membranes were then washed with water and vacuum dried to obtain the weight of polymer in each piece. Table 3 lists the calculated mole ratios of the amounts of copper extracted by the acid in relation to linking groups in the membranes.

EXAMPLE 4

Membrane pellicles prepared as in Example 2 were reacted as described therein with the solutions shown in Table 4. The Table shows the effect of particular copper salt solutions on permselective properties.

1000 parts per million sulfate ion added as sodium sulfate (typical of a sulfate-brackish feed) and operating at a pressure of 210 psi. In this test this membrane had a water permeability of 18.2 gal./sq. ft./day and a sulfate passage of 1.1 percent after 72 hours. The sulfate ion concentration in the solution passing through the membrane was determined conductometrically.

This same portion of treated membrane was again flushed with water and tested for its permselective properties by the procedure and conditions of Example

TABLE 3

| Ex. No. | Reacting Solution | | | | | Membrane Properties | | |
|---|---|---|---|---|---|---|---|---|
| | Solvent | Salt | Molar Concentration | Time | Color | Ratio of Copper To Linking Groups | Water Permeability Gal./Sq.Ft./Day | Chloride Passage, Percent |
| Control | None | None | — | — | None | — | 13.9 | 1.56 |
| Control | None | None | — | — | None | 0.0014 | — | — |
| 3A | Methanol | $CuSO_4$ | .0314 | 48 hrs. | Brown | 0.571 | — | — |
| 3B | Methanol | $CuSO_4$ | .0314 | 48 hrs. | Brown | — | 23.9 | 5.23 |

TABLE 4

| Example Number | Reacting Solution | | | | Membrane Properties | | Hours on Test |
|---|---|---|---|---|---|---|---|
| | Salt | Molar Concentration | Medium | Color | Water Permeability gal./sq. ft./day | Chloride Passage, Percent | |
| Control | None | — | (1) | None | 15.7 | 0.88 | 168 |
| 4A | $CuSO_4$ | .0314 | (1) | Dk.Brown | 23.5 | 2.39 | 168 |
| 4B | $Cu(NO_3)_2$ | .0314 | (1) | Dk.Brown | 24.3 | 1.83 | 168 |
| 4C | $Cu(C_2H_3O_2)_2$ | .0314 | (1) | Dk.Brown | 27.6 | 4.29 | 168 |
| Control | None | — | methanol | None | 15.5 | 0.88 | 192 |
| 4D | $CuSO_4$ | .0314 | methanol | Dk.Brown | 27.3 | 5.77 | 192 |
| 4E | $Cu(NO_3)_2$ | .0314 | methanol | Dk. Brown | 26.4 | 2.73 | 192 |
| 4F | $Cu(C_2H_3O_2)_2$ | .0314 | methanol | Dk. Brown | 31.2 | 10.4 | 192 |

(1) 50/50 Mixture of equal volume of methanol and water

EXAMPLE 5

This Example shows permselectivity of the novel membranes with a variety of feed solutions.

The polymer solution of Example 2 was cast into a tubular membrane pellicle as described in Example 1, except that the heating time was 85 min. This membrane pellicle was rinsed with water and stored in water. The membrane pellicle was immersed in a 0.0314 molar solution of cupric acetate in a mixture of equal volumes of methanol and water. The pH of this solution was adjusted to 4.6 with glacial acetic acid. After 48 hours the treated tubular membrane was rinsed with water, slit axially to form a flat membrane, and stored in water. One portion of this treated membrane was tested for its permselective properties toward sea water as described in Example 1. After 72 hours the membrane had a water permeability of 32.5 gal/sq. ft./day and a chloride passage of 9.4 percent.

Another portion of this treated membrane was tested for its permselective properties by the procedure and conditions of Example 1, except using an aqueous test solution containing 1500 parts per million of chloride ion added as sodium chloride (typical of a chloride-brackish feed) and operating at a pressure of 230 psi. In this test this membrane had a water permeability of 19.5 gal./sq. ft./day and a chloride passage of 9.7 percent after 72 hours. The chloride ion concentration in the solution passing through the treated membrane was determined conductometrically.

This same portion of treated membrane was then flushed with water and tested for its permselective properties by the procedure and conditions of Example 1, except using an aqueous test solution containing 1, except using an aqueous solution containing 2 weight percent of a polysaccharide (Dextran-20) and operating at a pressure of 200 psi. This feed solution is typical of a non-ionic ultrafiltration-type feed. In this test this membrane had a water permeability of 15.5 gal./sq. ft./day and 100 percent rejection of Dextran after 72 hours. The Dextran concentration in the solution passing through the membrane was determined by refractive index.

This same portion of treated membrane was again flushed with water and tested for its permselective properties by the procedure and conditions of Example 1, except using an aqueous test solution containing 3030 parts per million of chloride ion added as sodium chloride, and operating at a pressure of 600 psi. In this test this membrane has a water permeability of 31.4 gal./sq. ft./day and a chloride passage of 6.8 percent after 72 hours. The chloride ion concentration in the solution passing through the membrane was determined conductometrically.

EXAMPLE 6

A casting solution of the polymer of Example 1 was prepared which had the following composition:

| Component | Parts by Weight | Percentage |
|---|---|---|
| Polymer | 13.5 | |
| Lithium nitrate | 4.1 | 15.1 |
| Calcium chloride | 2.7 | 9.4 |
| Triethanolamine | 0.07 | |
| Dimethylacetamide | 79.63 | |

This casting solution was drawn on glass plates at about 25°C. into films with a nominal thickness of 15 mils. The film-bearing glass plates were heated to 100°C. during about 15 minutes and held at this temperature for about 45 minutes in a ventilated hood, evaporating a major part of the dimethylacetamide solvent and thereby obtaining solution pellicles.

These solution pellicles and the supporting glass plates were cooled for about two minutes to about 40°C. and then were immersed for about one hour in various stirred solutions. One solution pellicle was immersed in 0.0157 Molar copper sulfate in a mixture of equal volumes of methanol and water, thereby extracting a major portion of the salts and solvent from the solution pellicle to obtain a membrane containing copper as shown by its brown color. Another solution pellicle was immersed in a mixture of equal volumes of methanol and water acidified with sulfuric acid to the same pH (4.5) as that of the solution containing copper sulfate. The resulting membrane was essentially colorless. These membranes were rinsed with water and stored in water.

The permselective properties of these membranes were determined under reverse osmosis conditions as Example 1. The membrane reacted with a copper sulfate solution had, after 72 hours under the described test conditions, a water permeability of 33.3 gallons per square foot per day and a chloride passage of 10.1 percent. The membrane contacted with the mixture of methanol and water not containing copper sulfate had after the same test time a water permeability of 17.2 gallons per square foot per day and a chloride passage of 1.36 percent.

EXAMPLE 7

This Example shows the use of various square planar coordinating metals reacted with solution pellicles.

Casting solutions of the polymer of Example 1 were prepared which had the following composition:

| Component | Parts by Weight | Percentage |
|---|---|---|
| Polymer | 15 | |
| Lithium nitrate | 4.5 | 16.5 |
| Plasticizer | 6.0 | 40 |
| Triethanolamine | 0.08 | |
| Dimethylacetamide | 74.42 | |

Solution pellicles were prepared from these casting solutions as described in Example 6 with the differences in total heating times indicated in Table 5. These solution pellicles were immersed as described in Example 6, except using the solutions described in Table 5 and the resulting membranes were rinsed with water and stored in water. The permselective properties of these membranes were determined as described in Example 1 to obtain the data given in Table 5.

Portions of three of these membranes about 3.5 inches by 5.5 inches in size were soaked for 7 days in aqueous sulfuric acid having a pH of 1.0. These portions were then washed with water and vacuum dried to obtain the weight of polymer in each portion and the copper concentrations of the sulfuric acid solutions were determined. Table 5 lists the calculated ratios of the gram-atomic-weights of copper extracted by the dilute sulfuric acid and the gram-formula-weights of linking groups in the membranes.

TABLE 5

| Example Number | Solution Pellicle Heating, Minutes | Reacting Solution | | | Ratio Copper to Linking Groups | Membrane Properties | |
|---|---|---|---|---|---|---|---|
| | | Salt | Molar Concentration | pH | Color | | Water Permeability gal./sq.-ft./day | Chloride Passage, Percent |
| Control | 60 | None | — | 4.4 | None | — | 11.8 | 0.44 |
| 7A | 60 | CuSO₄ | 0.0157 | 4.4 | Lt.Brown | — | 17.6 | 1.2 |
| 7B | 60 | CuSO₄ | 0.0157 | — | Lt.Brown | 0.0795 | — | — |
| 7C | 45 | CuSO₄ | 0.0157 | 4.6 | Lt.Brown | — | 16.3 | 0.87 |
| 7D | 60 | CuSO₄ | 0.0314 | — | Brown | 0.091 | — | — |
| 7E | 45 | CuSO₄ | 0.0314 | 4.5 | Brown | — | 18.1 | 1.2 |
| 7F | 60 | CuSO₄ | 0.0785 | — | Dk.Brown | 0.1075 | — | — |
| 7G | 45 | CuSO₄ | 0.0785 | 4.3 | Dk.Brown | — | 21.8 | 1.4 |
| Control | 45 | None | — | 6.0 | None | — | 14.7 (1) | 0.49 |
| 7H | 45 | NiSO₄ | 0.0157 | 6.85 | None | — | 18.2 (1) | 0.91 |
| 7I | 45 | CoSO₄ | 0.0157 | 6.9 | None | — | 18.3 (1) | 0.83 |
| 7J | 45 | PdCl₂ | 0.0262 | 4.0 | Orange | — | 15.6 | 0.57 |

(1) Test Time 48 hours; all others 96 hours.

EXAMPLE 8

This Example shows various square planar coordinating metals reacted with solution pellicles.

Casting solutions of the polymer of Example 1 were prepared with the following composition:

| Component | Parts by Weight | Percentage |
|---|---|---|
| Polymer | 13 | |
| Lithium nitrate | 3.9 | 16.25 |
| Calcium chloride | 2.6 | 10.25 |
| Plasticizer | 5.2 | 40 |
| Triethanolamine | 0.07 | |
| Dimethylacetamide | 75.23 | |

Solution pellicles were prepared from these casting solutions as described in Example 6. These solutions pellicles were immersed as described in Example 6 in the solutions of Table 6 containing either water or a mixture of equal volumes of methanol and water as the medium. The resulting membranes were rinsed with water and stored in water. The permselective properties of portions of these membranes were determined as described in Example 1 (except with the noted variations in total test time) to obtain the data given in Table 6, and other portions of three of these membranes were soaked for 7 days in aqueous sulfuric acid having a pH of 1.0 as described in Example 7. Table 6 lists the calculated ratios of the gram-atomic-weights of copper extracted by the dilute sulfuric acid and the gram-formula-weights of linking groups in these membranes.

Control data are given for several of the Examples in Table 6. Control data for other Examples of the Table have not been set out for the sake of simplicity.

EXAMPLE 9

Solution pellicles prepared as described in Example 8 were immersed as described in Example 6 in solutions containing methanol as the medium. The resulting membranes were rinsed with water and stored in water. The permselective properties of these membranes were determined as described in Example 1 (except with the noted variation in total test time) to obtain the data given in Table 7 below.

Control data are given for several of the Examples in Table 7. Control data for other Examples of the Table have not been set out for the sake of simplicity.

Solution pellicles were prepared from this casting solution as described in Example 6 except that the total heating time was 120 minutes. One of these solution pellicles was immersed as described in Example 6 in 0.0157 Molar copper sulfate in a mixture of equal volumes of methanol and water. A second was similarly immersed in 0.0314 Molar copper sulfate in the same medium. A third was immersed in a similar medium containing no copper salt but acidified with sulfuric acid to the same pH (4.5) as that of the solutions containing copper sulfate. The resulting membranes were rinsed with water and stored in water.

The permselective properties of these membranes were determined in 96 hour tests under the conditions

TABLE 6

| Example No. | Salt | Reacting Solution Molar Concentration | Medium | pH | Color | Membrane Properties Ratio Copper to Linking Groups | Water Permeability gal./sq.-ft./day | Chloride Passage, Percent |
|---|---|---|---|---|---|---|---|---|
| Control | None | — | Water | 4.3 | None | — | 13.9 | 0.87 |
| 8A | CuSO₄ | 0.0157 | Water | 4.4 | Lt.Brown | — | 15.3 (1) | 1.3 |
| Control | None | — | (2) | 6.8 | None | — | 18.6 | 1.07 |
| Control | None | — | (2) | 4.7 | None | — | 15.3 | 0.91 |
| 8B | CuSO₄ | 0.0157 | (2) | — | Lt.Brown | 0.1115 | — | — |
| 8C | CuSO₄ | 0.0157 | (2) | 4.7 | Lt.Brown | — | 26.9 | 6.4 |
| 8D | CuSO₄ | 0.0314 | (2) | — | Brown | 0.1505 | — | — |
| 8E | CuSO₄ | 0.0314 | (2) | 4.5 | Brown | — | 36.6 | 10.7 |
| 8F | CuSO₄ | 0.0785 | (2) | — | Dk.Brown | 0.166 | — | — |
| 8G | CuSO₄ | 0.0785 | (2) | 4.2 | Dk.Brown | — | 52.1 | 50.4 |
| 8H | NiSO₄ | 0.0157 | (2) | 6.8 | None | — | 20.5 | 1.77 |
| 8I | NiSO₄ | 0.0314 | (2) | 6.8 | None | — | 24.5 | 2.4 |
| 8J | CoSO₄ | 0.0157 | (2) | — | None | — | 18.3 | 1.54 |
| 8K | CoSO₄ | 0.0314 | (2) | — | None | — | 19.1 | 1.32 |
| 8L | PdCl₂ | 0.0262 | (2) | 4.0 | Orange | — | 25.1 | 1.81 |

(1) Test time 48 hours; all others 96 hours
(2) Mixture of equal volumes of methanol and water

TABLE 7

| Example Number | Salt | Reacting Solution Molar Concentration | pH | Color | Membrane Properties Water Permeability gal./sq.-ft./day | Chloride Passage, Percent |
|---|---|---|---|---|---|---|
| Control | None | — | 8.0 | None | 14.6 | 0.7 |
| Control | None | — | 8.0 | None | 17.3 | 0.99 |
| Control | None | — | — | None | 19.7 (1) | 2.3 |
| Control | None | — | — | None | 17.0 | 1.0 |
| 9A | CuSO₄ | 0.0157 | 3.8 | Dk.Brown | 49.8 | 31.3 |
| 9B | CuSO₄ | 0.0314 | 3.0 | Dk.Brown | 56.6 | 34.8 |
| 9C | Cu(NO₃)₂ | 0.0157 | — | Dk.Brown | 36.0 (1) | 14.0 |
| 9D | Cu(NO₃)₂ | 0.0314 | — | Dk.Brown | 39.9 (1) | 14.5 |
| 9E | Cu(NO₃)₂ | 0.0785 | — | Dk.Brown | 50.8 (1) | 18.5 |
| 9F | Cu(NO₃)₂ | 0.157 | — | Dk.Brown | 48.2 (1) | 18.5 |
| 9G | NiSO₄ | 0.0157 | 7.1 | None | 19.9 | 5.0 |
| 9H | NiSO₄ | 0.0314 | 6.7 | None | 27.4 | 14.2 |
| 9I | CoSO₄ | 0.0157 | — | None | 17.3 | 2.1 |
| 9J | CoSO₄ | 0.0314 | — | None | 24.3 | 8.3 |

(1) Test time 72 hours, all others 96 hours

EXAMPLE 10

Casting solutions of the polymer of Example 1 were prepared which had the following composition:

| Component | Parts by Weight | Percentage |
|---|---|---|
| Polymer | 13 | |
| Lithium nitrate | 1.3 | 5.5 |
| Calcium chloride | 5.2 | 20.9 |
| Plasticizer | 5.2 | 40 |
| Triethanolamine | 0.07 | |
| Dimethylacetamide | 75.3 | | described in Example 1. The membrane reacted with the 0.0157 Molar copper sulfate solution had a water permeability of 36.5 gallons per square foot per day and a chloride passage of 10.7 percent. The membrane reacted with the 0.0314 Molar solution had a water permeability of 36.6 gallons per square foot per day and a chloride passage of 12.1 percent. The membrane contacted with the solution containing no copper salt had a water permeability of 19.9 gallons per sqaure foot per day and a chloride passage of 4.7 percent.

EXAMPLE 11

The polymer solution of Example 3 was drawn on glass plates at 25°C. into a film with a nominal thickness of 15 mils. The film and glass support were heated on a hot plate to 100°C. over a 10 minute period and then held at this temperature. The total heating times are as indicated in Table 8. After the designated heating the solution pellicle was cooled for 2 minutes to a temperature of about 35°C. and then quickly immersed in a bath of the stirred reaction solution indicated in the Table, at a temperature of about 25°C. After one hour the films were removed from the bath, rinsed with water and stored in water until tested.

The permselective properties of portions of these membranes were determined in 168 hour tests under the conditions described in Example 1. The resultant data are reflected in Table 8. Other portions of several of these membranes, about 2 × 5 inches in size, were immersed for 5 days in aqueous sulfuric acid at a pH of 1.0. These membranes were then washed with water and vacuum dried to obtain the weight of polymer in each piece. The copper concentrations of the sulfuric acid solutions were determined. Table 8 lists the calculated mole ratios of the amounts of copper extracted by the dilute sulfuric acid in relation to the linking groups in the membranes.

Other membranes described in this Example were tested for their permselective properties in Reverse Osmosis Tests B through E. Each membrane was subjected to each test in succession with the membranes being rinsed with water between each test.

Reverse Osmosis Test B (Chloride-Brackish)

The permselective properties were determined by the procedure and conditions of Example 1, except using an aqueous test solution containing 1500 parts per million of chloride ion added as sodium chloride, and operating at a pressure of 230 psi. The chloride ion concentration in the solutions passing through the membranes were determined conductometrically. The data obtained are given in Table 9.

Reverse Osmosis Test C (Sulfate-Brackish)

The permselective properties were determined by the procedure and conditions of Example 1, except using an aqueous test solution containing 1000 parts per million of sulfate ion added as sodium sulfate, and operating at a pressure of 210 psi. The sulfate ion concentrations in the solutions passing through the membranes were determined conductometrically. The data obtained are shown in Table 9.

Reverse Osmosis Test D (Non-Ionic Ultrafiltration-Type)

The permselective properties were determined by the procedure and conditions of Example 1, except using an aqueous test solution containing 2 weight percent Dextran-20, and operating at a pressure of 200 psi. The Dextran concentrations in the solutions passing through the membranes were determined by refractive index. The data obtained are given in Table 9.

Reverse Osmosis Test E (High Chloride-Brackish)

The permselective properties were determined by the procedure and conditions of Example 1, except using an aqueous test solution containing 3030 parts per million of chloride ion added as sodium chloride, and operating at a pressure of 600 psi. The chloride ion concentrations in the solutions passing through the membranes were determined conductometrically. The data obtained are given in Table 9.

TABLE 8

| Example Number | Solution Pellicle Heating Time (min.) | Reacting Solution (Medium = 50/50 (vol.) methanol/water) | | | | Membrane Properties | | |
|---|---|---|---|---|---|---|---|---|
| | | Salt | Molar Concentration | pH | Color | Ratio Copper to Linking Groups | Water Permeability gal./sq.ft./day | Chloride Passage, percent |
| Control | 20 | None | — | 4.3 | None | 0.0009 | — | — |
| Control | 20 | None | — | 4.3 | None | — | 11.6 | 1.34 |
| 11A | 20 | CuSO$_4$ | .0157 | 4.3 | Brown | — | 25.4 | 8.82 |
| 11B | 20 | CuSO$_4$ | .0157 | 4.3 | Brown | 0.189 | — | — |
| 11C | 30 | CuSO$_4$ | .0157 | 4.3 | Brown | 0.151 | — | — |

EXAMPLE 12

Solution pellicles were prepared from the casting solution of Example 8 by the procedure of Example 6. These soltuion pellicles were immersed as described in Example 6 in the solutions shown in Table 9. The resulting membranes were rinsed with water and stored in water. The permselective properties of these membranes were determined as described in the Reverse Osmosis Tests described below.

Reverse Osmosis Test A (Sea Water)

Several of the membranes described in this Example were tested for their permselective properties as described in Example 1. The data obtained are given in Table 9.

TABLE 9

| Example Number | REACTING SOLUTION | | | | |
|---|---|---|---|---|---|
| | Salt | Molar Concentration | Medium | pH$^{(2)}$ | Color |
| Control | None | — | (3) | 4.6 | None |
| Control | None | — | (3) | 4.6 | None |
| 12A | Cu(C$_2$H$_3$O$_2$)$_2$$^{(1)}$ | 0.0157 | (3) | 4.7 | Dk Brown |
| 12B | " | 0.0157 | (3) | 4.7 | " |
| 12C | " | 0.0314 | (3) | 4.6 | " |
| 12D | " | 0.0314 | (3) | 4.6 | " |
| 12E | " | 0.0785 | (3) | 4.7 | " |

TABLE 9-continued

| Example Number | Salt | REACTING SOLUTION Molar Concentration | Medium | pH[2] | Color |
|---|---|---|---|---|---|
| 12F | " | 0.0785 | (3) | 4.7 | " |
| 12G | Cu(NO₃)₂ | 0.0314 | MeOH | — | " |
| 12H | " | 0.0314 | MeOH | — | " |

[1]Cupric acetate
[2]Adjusted with glacial acetic acid
[3]Equal vol. mix. of MeOH and H₂O

MEMBRANE PERMSELECTIVE PROPERTIES

| Example Number | TEST A Qp[1] (GFD) | TEST A SP[2] (%) | TEST B Qp[1] (GFD) | TEST B SP[2] (%) | TEST C Qp[1] (GFD) | TEST C SP[2] (%) | TEST D Qp[1] (GFD) | TEST D SP[2] (%) | TEST E Qp[1] (GFD) | TEST E SP[2] (%) |
|---|---|---|---|---|---|---|---|---|---|---|
| Control | 15.3 | 1.6 | — | — | — | — | — | — | — | — |
| Control | — | — | 8.7 | 3.0 | 9.1 | 0.4 | 8.6 | 0 | 21.3 | 1.7 |
| 12A | 33.5 | 10.7 | — | — | — | — | — | — | — | — |
| 12B | — | — | 27.1 | 14.0 | 25.0 | 0.9 | 22.2 | 0 | 40.6 | 6.9 |
| 12C | 37.3 | 23.6 | — | — | — | — | — | — | — | — |
| 12D | — | — | 25.4 | 26.1 | 23.2 | 1.4 | 17.3 | 0 | 34.9 | 18.4 |
| 12E | 35.9 | 39.9 | — | — | — | — | — | — | — | — |
| 12F | — | — | 20.5 | 42.1 | 19.3 | 1.8 | 17.9 | 0 | 41.5 | 30.0 |
| 12G | 34.2 | 9.4 | — | — | — | — | — | — | — | — |
| 12H | — | — | 18.6 | 10.5 | 18.8 | 0.8 | 17.0 | 0 | 37.4 | 6.6 |

[1]Water permeability in gal./sq. ft./day after 72 hours on test
[2]Solute passage in percent

EXAMPLE 13

A polymer solution of the composition of Example 2 was used to prepare three membrane pellicles by the procedure of Example 1 except that the heating time was 80 minutes. These membrane pellicles were stored in water for over 2.5 years. Portions of each of two of the pellicles were mounted in stirred test cells of the type mentioned in Example 1. The pellicles were exposed under reverse osmosis conditions (400 pounds per square inch gauge pressure) to a feed solution containing 0.0314 Molar cupric acetate in water adjusted to pH 5.0 weight acetic acid. After 144 hours the test cells were flushed with water. Other portions of the same two pellicles were immersed for 144 hours in the same cupric acetate solution and then rinsed with water.

The permselective properties of the resulting membranes (as well as the properties of two portions of the third tubular pellicle) were determined as described in Example 1 except that the chloride salt passage values were determined conductometrically. The copper contents of the membranes were determined as described in Example 3. The data obtained after 48 hours of permselectivity testing are given in Table 10.

The membrane pellicles contacted on only their more dense less porous surfaces with a Cu(II) salt solution contained insignificant amounts of copper and showed no significant change in permselective properties. The membranes immersed in the same Cu(II) salt solution increased significantly in water permeability and to a lesser degree in salt passage and contained significant amounts of copper. The significant improvement in properties is attributable to the fact that the pellicle was reacted with copper at the less dense side so that the copper complexed with the polymer to produce a membrane of this invention.

TABLE 10

| Membrane Pellicle | Number of Pellicles | Exposure Conditions | Color | Average Membrane Properties Ratio of Cu to Linking Groups | Water Permeability, gal./sq.ft/day | Chloride Passage (Percent) |
|---|---|---|---|---|---|---|
| A | 3 | Dense less porous surface only, 400 psig | None | 0.005 | 11.8 | 0.78 |
| A | 2 | Both surfaces, immersion | Dk.Brn. | 0.306 | 19.3 | 1.73 |
| B | 3 | Dense less porous surface only, 400 psig | None | 0.005 | 13.5 | 0.77 |
| B | 3 | Both surfaces, immersion | Dk.Brn. | 0.279 | 21.8 | 1.89 |
| C | 2 | None | None | 0.002 | 15.4 | 1.11 |

I claim:

1. A permselective polymeric asymmetric membrane comprising
   i. a diacyl hydrazide-containing, substantially linear, aromatic, synthetic organic polymer comprising alternating linking groups and organic radicals, and
   ii. one or a mixture of Co(II), Ni(II), Cu(II) and Pd(II) metal wherein the metal is in square planar coordination complex relationship with the polymer of (i), the permselective membrane characterized by having metal complexed with the polymer in the amount of at least one-gramatomic weight of metal for each 20 gram-formula-weights of linking groups, the polymer of (i) being further characterized by having the formula

wherein
the —L— groups and —R— radicals are alternating, each —L— group is a linking group and at least about 50 percent of the —L— groups contain a nitrogen atom in the polymer chain, and at least 5 percent of the —L— groups contain the diacyl hydrazide group

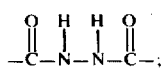

each —R— group is an organic radical and at least about 50 percent of the —R— groups consist essentially of a 5-member ring or a 6-member ring subject to resonance bonding; and
the degree of polymerization is defined by n, an integer sufficiently large to provide film-forming molecular weight; the polymer having a solubility at 25°C. of at least about 10 percent by weight in a solvent medium consisting essentially of from 0 to 3 percent by weight of lithium chloride dissolved in at least on member selected from the group consisting of dimethylacetamide, dimethyl sulfoxide, N-methylpyrrolidone and hexamethylphosphoramide.

2. A membrane according to claim 1 wherein at least 5 percent of the linking groups contain the diacyl hydrazide group and the balance of the linking groups are selected from at least one member of the group consisting of amide groups, oxamide groups, acyl hydrazide groups, semi-carbazide groups, urea groups, and mixtures thereof.

3. A membrane according to claim 2 wherein the linking groups are amide groups and diacyl hydrazide groups.

4. A membrane according to claim 3 wherein the metal is Cu(II).

5. A membrane according to claim 3 wherein 50 percent of the linking groups present are amide groups and 50 percent of the linking groups are diacyl hydrazide groups.

6. A membrane according to claim 5 wherein the metal is Cu(II).

7. A membrane according to claim 2 wherein the linking groups are diacyl hydrazide groups.

8. A membrane according to claim 7 wherein the metal is Cu(II).

9. A membrane according to claim 2 wherein the metal is Cu(II).

10. A membrane according to claim 1 wherein the metal is Cu(II).

11. A process for preparing the membranes of claim 1 comprising reacting
a polymer-liquid pellicle of a diacyl hydrazidecontaining, substantially linear, aromatic, synthetic organic polymer comprising alternating linking groups and organic radicals, said pellicle having a porous side reactable with a metal salt solution, with
a metal salt solution comprising a salt of a metal or mixture of metals that will form square planar coordination complexes with the polymer, said metal selected from the group Co(II), Ni(II), Cu(II) and Pd(II), in a medium therefor, at a temperature between about −25°C. to 50°C., said reaction occurring at said porous side of said pellicle.

12. A process according to claim 11 wherein the polymer-liquid pellicle is selected from a member of the group consisting of an asymmetric permselective membrane pellicle having as liquid therein a nonsolvent for the polymer, and a solution pellicle having as liquid therein a solvent for the polymer.

13. A process according to claim 12 wherein the polymer-liquid pellicle is an asymmetric permselective membrane pellicle having as liquid therein a nonsolvent for the polymer.

14. A process according to claim 12 wherein the polymer-liquid pellicle is a solution pellicle having as liquid therein a solvent for the polymer.

15. A process according to claim 14 wherein the solution pellicle contains additionally at least one member of the group consisting of plasticizer, water and polymer-solubilizing salt.

16. A process according to claim 11 comprising contacting the polymer-liquid pellicle with the medium of the metal salt solution before reacting the pellicle with the metal salt solution.

17. A process for the reverse osmosis rejecting of solute from an aqueous solution, comprising contacting the permselective membrane of claim 1 with the aqueous solution at a pressure greater than the osmotic pressure of the solution.

* * * * *